UNITED STATES PATENT OFFICE 2,520,153

N - (DIARYLMETHYL) - TERTIARY - AMINO-
ALKANAMIDES AND THEIR PREPARATION

Elmer J. Lawson, East Greenbush, George M. Fohlen, Albany, and Aaron Addelston, Flushing, N. Y., assignors to Sterling Drug Inc., Wilmington, Del., a corporation of Delaware No Drawing. Application September 11, 1947, Serial No. 773,520

16 Claims. (Cl. 260—294)

This invention relates to N-diarylmethyl-tertiary-aminoalkanamides and salts thereof, and to methods of preparing the same.

We have found that compounds having the general formula

B—Y—CO—N(R)—CH(A)(A₁)

wherein B is an aliphatic tertiary-amino group, Y is a lower alkylene group, R is H or a lower alkyl group, and A and A₁ are aryl groups, exhibit valuable therapeutic properties, such as local anesthetic activity. In the above formula, the aliphatic tertiary-amino group designated as B is a group such as diethylamino, dimethylamino, methylethylamino, di-n-butylamino, 1-piperidyl, 2-methyl-1-piperidyl, 4-morpholinyl, 2-methyl-1-pyrrolidyl, or the like. The lower alkylene group designated as Y is a group such as CH₂, CH₂CH₂, CH₂CH₂CH₂, CH(CH₃), CH(C₂H₅), C(C₂H₅)₂, CH₂CH(CH₃), CH₂C(CH₃)₂, or the like. The lower alkyl group R is a group such as methyl, ethyl, n-propyl, 2-propyl, n-butyl, or the like. A and A₁ may be either unsubstituted phenyl or phenyl groups substituted by groups which are unreactive to acid halides. Such substituent groups include the following: alkoxyl, such as methoxyl, ethoxyl, and the like; lower alkyl, such as methyl, ethyl, 2-butyl, and the like; dialkylamino, such as diethylamino, dimethylamino, and the like; and halogen, such as chlorine, bromine or iodine. A and A₁ can be the same or different and can be linked to each other in ortho-positions, either directly to form the fluorene ring or through a bridge involving such elements as carbon, nitrogen, oxygen, and sulfur to form the rings of 9,10-dihydroanthracene, acridan, xanthene and thiaxanthene respectively. A few specific examples of compounds that come within the scope of our invention include the following:

N-benzohydryl-2-dimethylaminoethanamide, (CH₃)₂NCH₂CONHCH(C₆H₅)₂

N-benzohydryl-3-diethylaminopropanamide, (C₂H₅)₂NCH₂CH₂CONHCH(C₆H₅)₂

N - (bis(4 - methoxyphenyl)methyl) - 4 -(1 - piperidyl) butanamide,

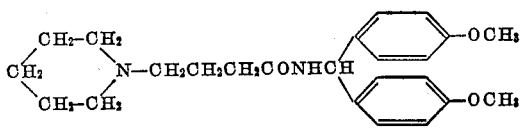

N - benzohydryl - N - ethyl - 3 - di - n - butylamino-2-methylpropanamide, (n-C₄H₉)₂NCH₂CH(CH₃)CON(C₂H₅)CH(C₆H₅)₂

N - (9 - fluorenyl) - 3 - (2 - methyl - 1 - piperidyl) - propanamide,

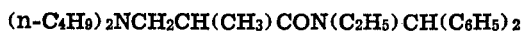

N - (bis(3 - ethoxyphenyl)methyl) - 3 - (4 - morpholinyl) butanamide,

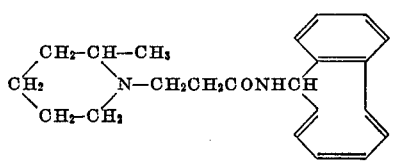

N-(9-xanthyl)-2-diethylaminoethanamide,

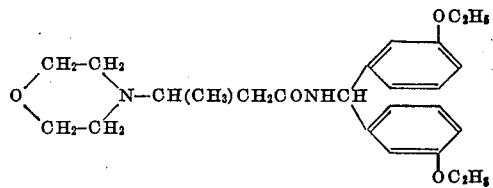

N-9-(9,10-dihydroanthryl)-3-dimethylaminopropanamide,

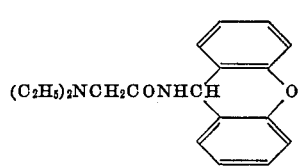

and the like.

The compounds of our invention can be prepared by various means. One method of preparation involves treating an (aliphatic tertiary-amino)alkanoyl halide with the appropriate diarylmethylamine or (lower alkyl)diarylmethylamine; for example, treating 3-diethylamino-2,2-diethylpropanoyl chloride with 9-fluorenylamine or methylbenzohydrylamine to yield respectively N -(9 - fluorenyl) - 3 - diethylamino - 2,2 - diethylpropanamide hydrochloride or N-(benzohydryl) - N - methyl - 3 - diethylamino - 2,2 - diethylpropanamide hydrochloride as shown in the following respective equations:

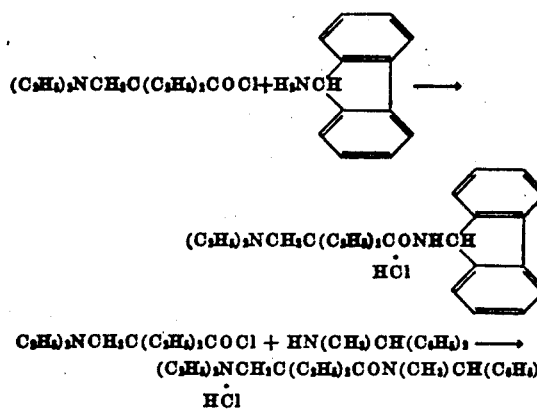

$(C_2H_5)_2NCH_2C(C_2H_5)_2COCl + HN(CH_3)CH(C_6H_5)_2 \longrightarrow$
$(C_2H_5)_2NCH_2C(C_2H_5)_2CON(CH_3)CH(C_6H_5)_2$
$\cdot HCl$ An alternative method of preparation using acid halides is afforded by treating the appropriate diarylmethylamine with a haloalkanoyl halide, preferably the chloride, to yield an N-diarylmethylhaloalkanamide, which then can be treated with a secondary amine such as diethylamine, piperidine, and the like. Thus, N-(bis(3-ethoxyphenyl)methyl)-3-dimethylaminopropanamide is prepared by reacting 3-chloropropanoyl chloride with bis(3-ethoxyphenyl)-methylamine to yield N-(bis(3-ethoxyphenyl)methyl)-3-chloropropanamide which is then treated with dimethylamine; these reactions are illustrated by the following equations:

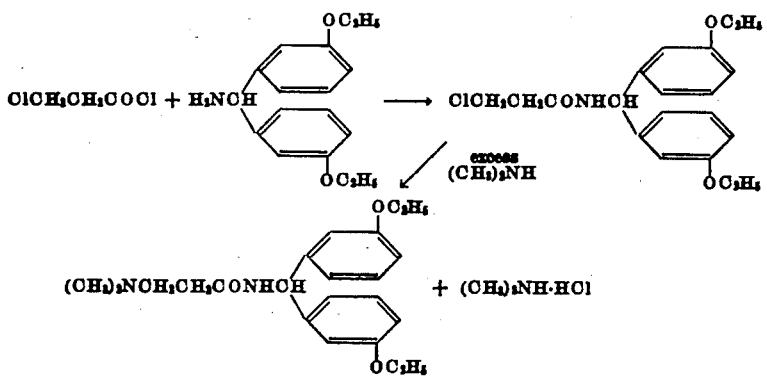

Another method that can be used to prepare the N-diarylmethyl-tertiary-aminoalkanamides of our invention comprises reacting a lower alkyl ester of a tertiary-aminoalkanoic acid with a diarylmethylamine. This method is illustrated by the following reaction between methyl 3-dimethylaminopropanoate and benzohydrylamine:

$(CH_3)_2NCH_2CH_2COOCH_3 + H_2NCH(C_6H_5)_2 \longrightarrow$
$(CH_3)_2NCH_2CH_2CONHCH(C_6H_5)_2 + CH_3OH$ In the last two mentioned processes the corresponding N-diarylmethyl-N-(lower alkyl)-(aliphatic tertiary-amino)alkanamides are prepared if the diarylmethylamines used above are substituted by corresponding (lower alkyl)diarylmethylamines.

It is often convenient to isolate and use the basic amides of our invention as the water-soluble hydrochloric acid addition salts. It is, of course, understood that other water-soluble salts, such as those derived from other non-toxic inorganic acids, including hydrobromic acid, sulfuric acid, phosphoric acid, and the like, and non-toxic organic acids, including tartaric acid, citric acid, succinic acid, and the like will serve the same purpose and are within the scope of our invention.

The following examples illustrate specific embodiments of the invention. It is to be understood that the invention is not limited thereto but only by the scope of the appended claims.

EXAMPLE 1

*N-benzohydryl-3-diethylaminopropanamide hydrochloride*

A solution of 9.2 g. of N-benzohydryl-3-chloropropanamide and 12.2 g. (17 ml.) of diethylamine in 100 ml. of benzene plus a few ml. of ethanol is refluxed for one hour. Then the benzene solution is cooled, washed with water, and dried, either with anhydrous sodium carbonate or by removal of some benzene by distillation. After a volume or two of dry ether has been added to the resulting dry solution, the ether-benzene solution is treated with alcoholic hydrogen chloride whereupon a white, crystalline precipitate separates. A sample recrystallized from ethanol melts about 182-3° C. This product is N-benzohydryl-3-diethylaminopropanamide hydrochloride of the formula

$(C_2H_5)_2NCH_2CH_2CONHCH(C_6H_5)_2$
$\cdot HCl$

The above starting material, N-benzohydryl-3-chloropropanamide, which melts at 176° C., is prepared readily by carefully mixing a benzene solution of benzohydrylamine with 3-chloropropanoyl chloride in the presence of pyridine at 0° C. and stirring the resulting mixture about thirty minutes. Water is added to the reaction mixture to dissolve the pyridine hydrochloride, and the white product is collected by filtration. This material, N-benzohydryl-3-chloropropanamide, is purified by several crystallizations from acetone.

If the above procedure is employed using N-(9-fluorenyl)-3-chloropropanamide instead of N-benzohydryl-3-chloropropanamide, the product obtained is N-(9-fluorenyl)-3-diethylaminopropanamide hydrochloride of the formula

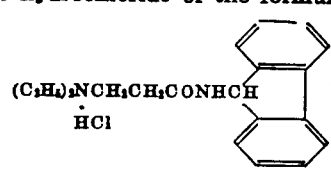
$(C_2H_5)_2NCH_2CH_2CONHCH$
$\cdot HCl$

The N-(9-fluorenyl)-3-chloropropanamide is prepared from 9-fluorenylamine and 3-chloropropanoyl chloride according to the above directions given for the preparation of N-benzohydryl-3-chloropropanamide.

Further, when the above procedure is carried out using N-benzohydryl-N-methyl-3-chloropropanamide instead of N-benzohydryl-3-chloropropanamide, the product obtained is N-benzohydryl-N-methyl - 3 - diethylaminopropanamide hydrochloride of the formula

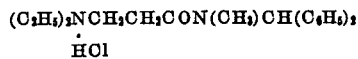

The intermediate N-benzohydryl-N-methyl-3-chloropropanamide is prepared from methylbenzohydrylamine (See Busch and Leefhelm, J. pr. Chem. 77, 20–4 (1908), for the preparation of methylbenzohydrylamine) and 3-chloropropanoyl chloride according to the above directions given for the preparation of N-benzohydryl-3-chloropropanamide.

EXAMPLE 2

*N-benzohydryl-3-(1-piperidyl)propanamide hydrochloride*

A solution of 9.2 g. of N-benzohydryl-3-chloropropanamide and 14.3 g. of piperidine in 200 ml. of benzene is refluxed for one hour on a steam bath. The reaction mixture is cooled and the piperidine hydrochloride which separates is removed by filtration. After the filtrate has been washed with water, about an equal volume of ether is added and the resulting ether-benzene solution is dried over anhydrous sodium carbonate. Addition of a solution of hydrogen chloride in alcohol to the dried solution causes precipitation of a white flaky crystalline material, which is filtered, washed with ether, and air-dried. Recrystallization of this crystalline material from ethanol yields the desired product, N-benzohydryl-3-(1-piperidyl)propanamide hydrochloride, melting about 217° C. and having the formula

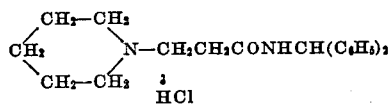

If morpholine is substituted for piperidine in the above example, the corresponding N-benzohydryl-3-(4-morpholinyl)-propanamide hydrochloride, melting about 203° C., and having the following formula, is obtained:

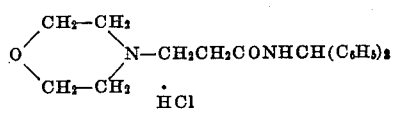

When 2-methylpiperidine is used in place of piperidine, the corresponding N-benzohydryl-3-(2-methyl-1-piperidyl)propanamide hydrochloride, of the following formula, is obtained:

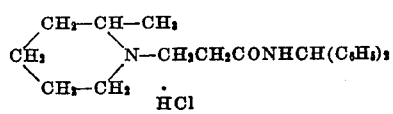

EXAMPLE 3

*N-benzohydryl-3-dimethylaminopropanamide hydrochloride*

A solution of 9.2 g. of N-benzohydryl-3-chloropropanamide and 15 ml. of 50% aqueous dimethylamine solution in 50 ml. of ethanol is refluxed for three hours on a steam bath. The reaction mixture is cooled and poured into 600 ml. of water, and the resulting aqueous solution is extracted with benzene. The benzene extract is washed with water, dried over anhydrous sodium carbonate, and treated with a slight excess of alcoholic hydrogen chloride. After addition of about 800 ml. of ether, there separates a white, sticky precipitate, which completely solidifies when placed in an ice bath. Recrystallization of this solid from dioxane gives the product, N-benzohydryl - 3 - dimethylaminopropanamide hydrochloride, melting at 163–4° C. and having the formula:

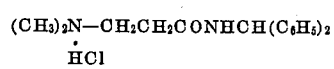

When N-bis(3-ethoxyphenyl)methyl-3-chloropropanamide is used instead of N-benzohydryl-3-chloropropanamide, N - bis(3 - ethoxyphenyl) - methyl - 3 - dimethylaminopropanamide hydrochloride, having the following formula, is formed:

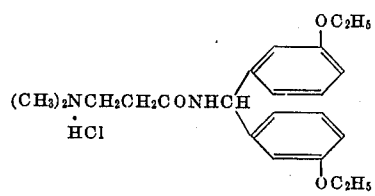

EXAMPLE 4

*N-benzohydryl-2-diethylaminoethanamide hydrochloride*

This preparation is carried out like Example 1, but using 8.7 g. of N-benzohydryl-2-chloroethanamide, 17 ml. of diethylamine, 100 ml. of benzene, and a defluxing period of two hours. The product, N - benzohydryl-2-diethylaminoethanamide hydrochloride, melts about 173–5° C. after recrystallization from isopropanol, and has the formula

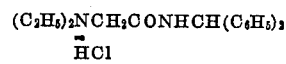

The above starting material, N-benzohydryl-2-chloroethanamide, which melts at 128° C., is prepared from benzohydrylamine and chloroacetyl chloride in the presence of pyridine, according to the directions given for the preparation of N - benzohydryl-3-chloropropanamide under Example 1.

We claim:

1. A member of the group consisting of a basic amide having the formula

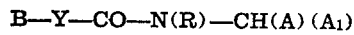

where B is a di(lower alkyl)amino group attached to Y through its nitrogen atom and wherein the alkyl groups may be joined to form a member of the group consisting of piperidines, morpholines and pyrrolidines, Y is a lower alkylene group, R is a member of the group consisting of hydrogen and a lower alkyl group, and A and $A_1$ are aryl groups of the benzene series, and acid addition salts thereof.

2. A member of the group consisting of a basic amide having the formula

where B is a di(lower alkyl)amino group attached to Y through its nitrogen atom and wherein the alkyl groups may be joined to form a member of the group consisting of piperidines, morpholines and pyrrolidines and Y is a lower alkylene group, and acid addition salts thereof.

3. A member of the group consisting of N-benzohydryl - 3 - diethylaminopropanamide and acid addition salts thereof.

4. A member of the group consisting of N-benzohydryl-3-(1-piperidyl)propanamide and acid addition salts thereof.

5. A member of the group consisting of N-benzohydryl-2-diethylaminoethanamide and acid addition salts thereof.

6. A process of preparing a basic amide having the formula

B—Y—CO—N(R)—CH(A)(A₁)

where B is a di(lower alkyl)amino group attached to Y through its nitrogen atom and wherein the alkyl groups may be joined to form a member of the group consisting of piperidines, morpholines and pyrrolidines, Y is a lower alkylene group, R is a member of the group consisting of hydrogen and a lower alkyl group, and A and A₁ are aryl groups of the benzene series, which comprises treating a compound having the formula halogen—Y—CO—N(R)—CH(A)(A₁)

with a secondary amine having the formula BH.

7. The process of preparing a basic amide having the formula

B—Y—CO—NH—CH(C₆H₅)₂ where B is a di(lower alkyl)amino group attached to Y through its nitrogen atom and wherein the alkyl groups may be joined to form a member of the group consisting of piperidines, morpholines and pyrrolidines and Y is a lower alkylene group, which comprises treating a compound having the formula halogen—Y—CO—NH—CH(C₆H₅)₂ with a secondary amine having the formula BH.

8. The process of preparing N-benzohydryl-3-diethylaminopropanamide which comprises treating N-benzohydryl-3-chloropropanamide with diethylamine.

9. The process of preparing N-benzohydryl-3-(1-piperidyl)propanamide which comprises treating N-benzohydryl-3-chloropropanamide with piperidine.

10. The process of preparing N-benzohydryl-2-diethylaminoethanamide which comprises treating N-benzohydryl-2-chloroethanamide with diethylamine.

11. A member of the group consisting of a basic amide having the formula (lower alkyl)₂N—Y—CO—NH—CH(C₆H₅)₂ wherein Y is a lower alkylene group, and acid addition salts thereof.

12. A member of the group consisting of a basic amide having the formula

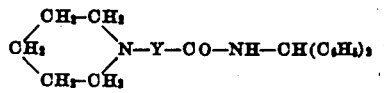

wherein Y is a lower alkylene group, and acid addition salts thereof.

13. The process of preparing a basic amide having the formula (lower alkyl)₂N—Y—CO—NH—CH(C₆H₅)₂ wherein Y is a lower alkylene group, which comprises treating a compound having the formula halogen—Y—CO—NH—CH(C₆H₅)₂ with a secondary amine having the formula (lower alkyl)₂NH.

14. The process of preparing a basic amide having the formula

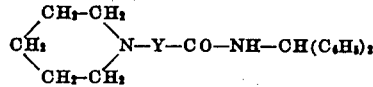

wherein Y is a lower alkylene group, which comprises treating a compound having the formula halogen—Y—CO—NH—CH(C₆H₅)₂ with piperidine.

15. A member of the group consisting of N-benzohydryl-3-dimethylaminopropanamide and acid addition salts thereof.

16. The process of preparing N-benzohydryl-3-dimethylaminopropanamide which comprises treating N-benzohydryl-3-chloropropanamide with dimethylamine.

ELMER J. LAWSON.
GEORGE M. FOHLEN.
AARON ADDELSTON.

REFERENCES CITED

The following references are of record in the file of this patent:

UNITED STATES PATENTS

| Number | Name | Date |
|---|---|---|
| 2,073,100 | Eisleb | Mar. 9, 1937 |
| 2,126,329 | Hoffer | Aug. 9, 1938 |
| 2,139,190 | Iselin et al. | Dec. 9, 1938 |
| 2,153,707 | Becherer et al. | Apr. 11, 1939 |
| 2,258,721 | Sallman | Oct. 14, 1941 |
| 2,326,497 | Riester et al. | Aug. 10, 1943 |
| 2,356,587 | Hentrich et al. | Aug. 22, 1944 |
| 2,411,662 | Martin et al. | Nov. 26, 1946 |
| 2,449,638 | Bruce et al. | Sept. 21, 1948 |